United States Patent
Saitou et al.

(10) Patent No.: US 7,603,895 B2
(45) Date of Patent: Oct. 20, 2009

(54) TRIGGER UNIT MOUNTING STRUCTURE FOR WHEEL POSITION DETECTION SYSTEM

(75) Inventors: Takashi Saitou, Okazaki (JP); Akira Takaoka, Okazaki (JP); Nobuya Watabe, Nagoya (JP); Masashi Mori, Obu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 12/330,791

(22) Filed: Dec. 9, 2008

(65) Prior Publication Data

US 2009/0145217 A1    Jun. 11, 2009

(30) Foreign Application Priority Data

Dec. 10, 2007   (JP) .............................. 2007-318397

(51) Int. Cl.
  *G01M 17/02*   (2006.01)
(52) U.S. Cl. ................... 73/146; 73/146.2; 73/146.5
(58) Field of Classification Search ...................... None
  See application file for complete search history.

(56) References Cited

U.S. PATENT DOCUMENTS

| | | | |
|---|---|---|---|
| 5,602,524 A | 2/1997 | Mock et al. | |
| 6,243,007 B1 * | 6/2001 | McLaughlin et al. | 340/447 |
| 6,292,095 B1 * | 9/2001 | Fuller et al. | 340/442 |
| 6,474,380 B1 * | 11/2002 | Rensel et al. | 152/152.1 |
| 6,486,771 B1 * | 11/2002 | Fuller et al. | 340/442 |
| 6,967,571 B2 * | 11/2005 | Tsujita | 340/447 |
| 7,104,438 B2 * | 9/2006 | Benedict | 235/375 |
| 7,271,711 B2 * | 9/2007 | Daiss et al. | 340/447 |
| 7,404,427 B2 * | 7/2008 | Hillman et al. | 157/1 |
| 7,406,876 B2 * | 8/2008 | Krozer et al. | 73/777 |
| 7,487,671 B1 * | 2/2009 | Zhu et al. | 73/146.5 |
| 2004/0135681 A1 | 7/2004 | Tsujita | |
| 2007/0008097 A1 | 1/2007 | Mori et al. | |
| 2007/0090970 A1 | 4/2007 | Watabe | |
| 2008/0055063 A1 | 3/2008 | Mori | |
| 2008/0150710 A1 | 6/2008 | Mori et al. | |
| 2008/0150711 A1 | 6/2008 | Mori et al. | |

* cited by examiner

*Primary Examiner*—Lisa M Caputo
*Assistant Examiner*—Jermaine Jenkins
(74) *Attorney, Agent, or Firm*—Nixon & Vanderhye P.C.

(57) ABSTRACT

A first trigger unit and a second trigger unit output trigger signals to transceivers disposed for the four wheels of a vehicle. The first and second trigger units are attached to wall surfaces of tire housings corresponding to the left front and left rear wheels respectively. Each of the first and second trigger units is arranged in a position of the wall surface having an angle from 5 to 25 degrees with respect to the side of the corresponding wheel. Transceivers attached to a right front and right rear wheels are thus located farther from the trigger units than the left front and left rear wheels, respectively. Such arrangement allows the transceivers attached to the right front and right rear wheels to receive the outputted trigger signals with sufficient accuracy due to high field strength.

9 Claims, 6 Drawing Sheets

TRIGGER UNIT MOUNTING STRUCTURE FOR WHEEL POSITION DETECTION SYSTEM

CROSS REFERENCE TO RELATED APPLICATION

This application is based on and incorporates herein by reference Japanese Patent Application No. 2007-318397 filed on Dec. 10, 2007.

FIELD OF THE INVENTION

The present invention relates to a trigger unit mounting structure or a trigger unit arrangement for a wheel position detection system.

BACKGROUND OF THE INVENTION

Patent document 1: JP-H7-507513 A (corresponding to U.S. Pat. No. 5,602,524)

Patent document 2: JP-2007-15491 A (corresponding to US-2007/0008097 A1)

A conventional tire air pressure detection apparatus includes a direct type, Herein, a transceiver contains a pressure sensor or the like to detect a tire air pressure. The transceiver is directly arranged in each of wheels attached to tires of a vehicle. Further, the body of the vehicle is equipped with an antenna and a receiver to receive a detection signal from the transceiver and detect a tire air pressure.

Such a direct-type tire air pressure detection apparatus uses ID information, which is assigned to a corresponding wheel to thereby determine whether the received data is transmitted inside of the subject vehicle and which wheel the data transmitting transceiver is attached to.

Such ID information is previously registered in the receiver. When receiving the data sent from the transceiver, the corresponding wheel can be determined based on the received ID information. In detail, the receiver is set to a transceiver ID registration mode; thereby, the trigger unit transmits a trigger signal to the transceiver. The transceiver transmits, in synchronization, data towards the receiver to thereby perform registering the ID (see Patent document 1).

Herein, it is assumed that a user changes the positions of the wheels, for instance, for rotating tires inside the relevant vehicle. In such a case, the tire air pressure detection apparatus cannot respond to the wheel position change. The user thus needs to read ID information of the wheels having been rotated and re-register ID information of the wheels. This poses complicated re-registration work, worsening the efficiency in rotating the tires.

Accordingly, it is desirable to detect a wheel position to which a transceiver is attached even without assigning ID information. Alternatively, it is desirable that the ID information can be automatically re-registered after the position change of the wheels.

Patent document 2 proposes a new technology, in which a trigger unit transmits a trigger signal having a constant strength; and each transceiver attached to each wheel detects a reception strength of the received trigger signal. Herein, it is considered that the strength of the trigger signal declines as the distance from the trigger unit increases; thus, the wheel position is detected based on the reception strength detected by the corresponding transceiver.

Further, to detect the wheel position appropriately, two trigger units of a front-side trigger unit and a rear-side trigger unit are arranged individually to correspond to the front wheels and the rear wheels, respectively.

In Patent document 2, for instance, the front-side trigger unit is arranged in a position different from the positions of the front wheels; while the rear-side trigger unit is arranged in a position different from the positions of the rear wheels. In such a case, one wheel may be closer to the corresponding trigger unit than the other wheel. Thereby, it should be designed that the transceiver attached to the farther-side wheel can receive a trigger signal outputted from the trigger unit and this should be achieved in both the front side and the rear side of the vehicle.

To achieve the above, the strength of the trigger signal may be increased. However, the signal outputted from the trigger unit for the front wheels may be received by the transceiver attached to the rear wheel. In other words, the trigger signal may be received by a transceiver other than a transceiver which should receive the trigger signal. In addition, the strength of the trigger signal may be restricted by regulations etc. The strength may be controlled at a certain level.

In contrast, there may be a cause for an attenuation of the trigger signal, such as a significant distance to the farther-side transceiver or an intervening object or metal member in an intermediate position to the farther-side transceiver. When the strength of the trigger signal is small, the field strength spread to each transceiver may become too low to keep the communication state stable.

SUMMARY OF THE INVENTION

In consideration of the above, it is an object to provide a technology for enabling a transceiver, which is attached to a wheel as a target, to receive a corresponding trigger signal appropriately.

According to an example of the present invention, a trigger unit mounting structure is provided as follows. The structure is for a wheel position detection system for a vehicle. The system includes a trigger arrangement for outputting a trigger signal over a magnetic field towards a transceiver attached to each of wheels of the vehicle by comprising a magnetic field type antenna being configured by a core wounded by a coil through which an electric current flows to generate the magnetic field. The transceiver receives the trigger signal, measures a reception strength of the received trigger signal, and transmits data of the measured reception strength to a receiver in a body of the vehicle. The wheel position detection system thus detects a wheel position of the each of the wheels based on the data transmitted from the transceiver. The trigger arrangement comprises a first trigger unit configured to output a trigger signal to first transceivers individually attached to a right front wheel and a left front wheel; and a second trigger unit configured to output a trigger signal to second transceivers individually attached to a right rear wheel and a left rear wheel. Each trigger unit of (i) the first trigger unit and (ii) the second trigger unit is arranged such that a closer-side wheel of each of (i) front wheels and (ii) rear wheels is closer to the each trigger unit than a farther-side wheel of the each of (i) front wheels and (ii) rear wheels. The closer-side wheel is accommodated in a tire housing having an internal wall surface facing the closer-side wheel. The each trigger unit is arranged at a point J on the internal wall surface. Herein, a vertical plane A is defined as a side plane of the closer-side wheel directed in a vehicle-length direction and orthogonal to a ground surface being horizontal, a horizontal plane B is defined as a plane including the point J and parallel with the ground surface, a curve X is defined by intersecting with each other (i) the horizontal plane B and (ii) the internal wall surface, a tangent Y is defined at the point J on the curve X, an intersecting point K is defined by intersecting with each other the vertical plane A and the tangent Y, a line Z is defined by projecting the tangent Y on an intersecting line formed by (i) the vertical plane A and (ii) the horizontal plane B, and an angle W as an angle of the internal wall against the side plane of the closer-side wheel is defined at the intersecting point K by (ii) the tangent Y and (ii) the line Z. Each of the first trigger unit and the second trigger unit is arranged at the point J such that the angle W is within a range between 5 degrees to 25 degrees.

In such a configuration, when a trigger signal is outputted from the trigger unit to a transceiver attached to the farther-side wheel, the resultant field strength can be increased, enabling the transceiver attached to the farther-side wheel to receive the trigger signal at a necessary accuracy.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
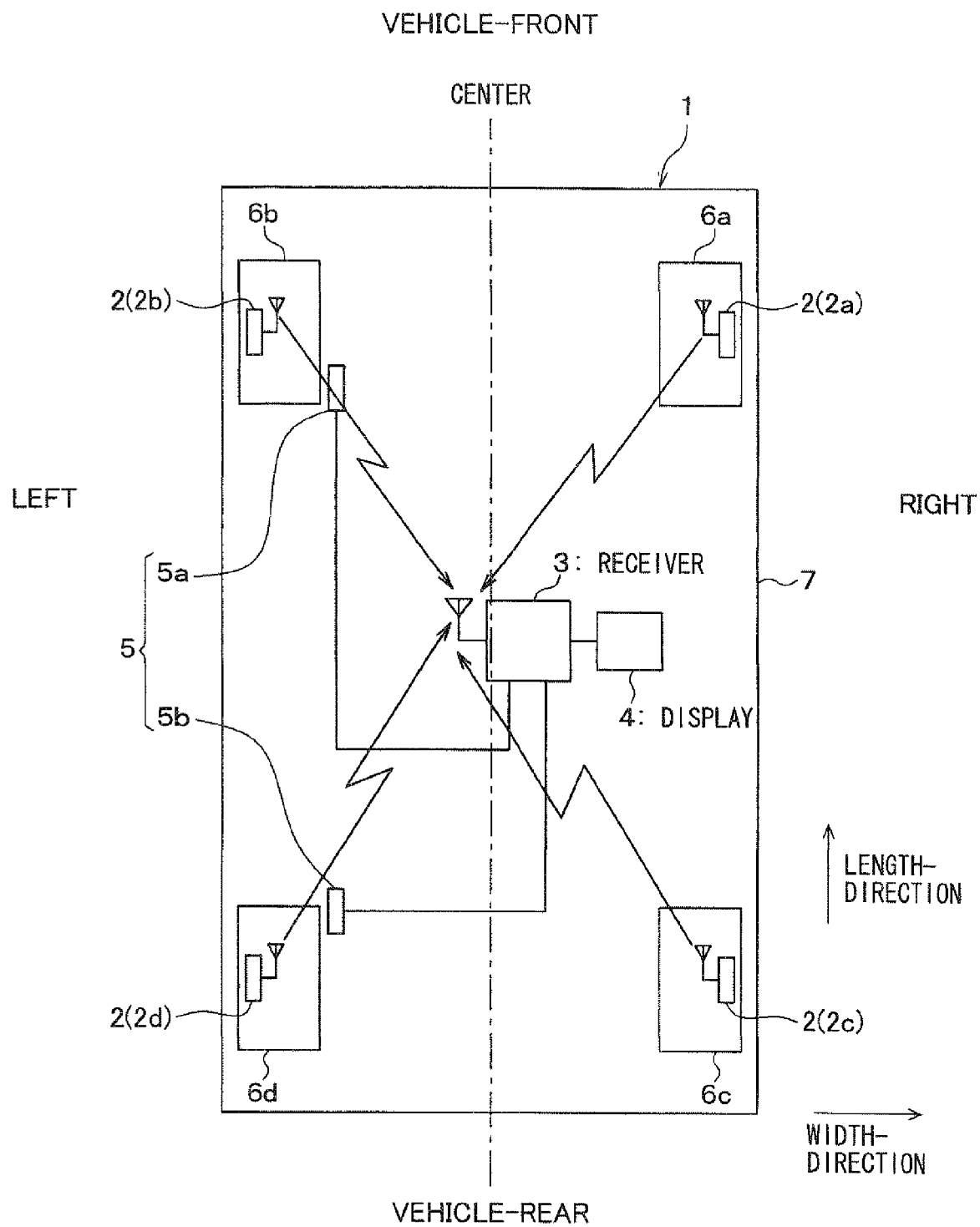
FIG. 1 is a diagram for illustrating an overall configuration of a tire air pressure detection system according to a first embodiment of the present invention.

A first embodiment according to the present invention will be explained with reference to drawings. FIG. 1 is a schematic plan view for illustrating an overall configuration of a tire air pressure detection system also functioning as a wheel position detection system provided in a subject vehicle 1 according to the first embodiment. Further, the following explains a trigger unit mounting structure or a trigger unit arrangement for the wheel position detection system.

In FIG. 1, the following are assumed: (1) the subject vehicle 1 is on a ground surface being a horizontal plane; (2) front and rear wheels 6a to 6d of the vehicle 1 are aligned in (parallel with) a vehicle-length direction (vehicle-front to vehicle-rear direction) to allow the vehicle to travel straightforward; and a rotation axis of each wheel is aligned in (or parallel with) a vehicle-width direction (or right to left direction). Further, a vehicle-height direction is assumed to be perpendicular or orthogonal to the ground surface.

As illustrated in FIG. 1, the tire air pressure detection system provided in the vehicle 1 includes a transceiver arrangement 2 including four transceivers 2a to 2d, a receiver 3, a display unit 4, and a trigger unit arrangement 5 including two trigger units 5a, 5b. For instance, the wheel position detection system can include the transceiver arrangement 2, the receiver 3, and the trigger unit arrangement 5.

The transceiver arrangement 2 includes the four transceivers 2a to 2d attached to four wheels 6a to 6d of the vehicle 1, respectively. In the transceiver arrangement 2, a trigger signal from the trigger arrangement is received and a reception strength of the received trigger signal is measured; further, a tire air pressure of a tire attached to each wheel 6a to 6d is detected. The data on the trigger signal reception strength and tire air pressure as detection results are stored, together with own ID information, in a single data frame or multiple data frames. The data frame or frames are then transmitted, for instance, as signals of an RF band.

In addition, the receiver 3 is attached to a body 7 of the vehicle 1, receives the data frame transmitted from the transceiver arrangement 2, and executes processes for a wheel position detection and a tire air pressure detection. That is, the receiver 3 includes a control section previously storing a program for a wheel position detection system. Based on the program, the control section of the receiver 3 transmits a trigger instruction signal to the trigger arrangement 5 for requesting a transmission of a trigger signal; receives the data frame transmitted from the transceiver arrangement 2 responding to the trigger signal; reads reception strength data of the trigger signal from the data frame; and determines which wheel 6a to 6d corresponding to the transceiver 2a to 2d having transmitted the above data frame based on the magnitude of the reception strength, etc.

Furthermore, after identifying the wheel 6a to 6d, which the data frame transmitting transceiver 2a to 2d is attached to, in the wheel position detection, the control section of the receiver 3 identifies the wheel based on ID information of each transceiver 2a to 2d stored in the received data frame while executing a variety of processes or calculations based on the data on the tire air pressure stored in the data frame to obtain a tire air pressure of the corresponding wheel 6a to 6d. The electric signal corresponding to the obtained tire air pressure is outputted in the display unit 4. For example, the obtained tire air pressure is compared with a predetermined threshold value Th. When it is detected that the tire air pressure is decreased, the control section of the receiver 3 outputs a message signal indicating the decrease of the tire air pressure in the display unit 4. Thus, the display unit 4 can receive a message signal indicating which wheel 6a to 6d has a tire in which an air pressure is decreased.

The display unit 4 is arranged at a position which can be seen by the driver, as illustrated in FIG. 1. For example, the display unit 4 includes an alarm lamp installed in an instrument panel in the vehicle 1. For instance, when receiving from the control section a message signal indicating that a tire air pressure is decreased, the display unit 4 displays information indicating the message signal, thus informing the driver of the tire air decrease.

Figure 2:
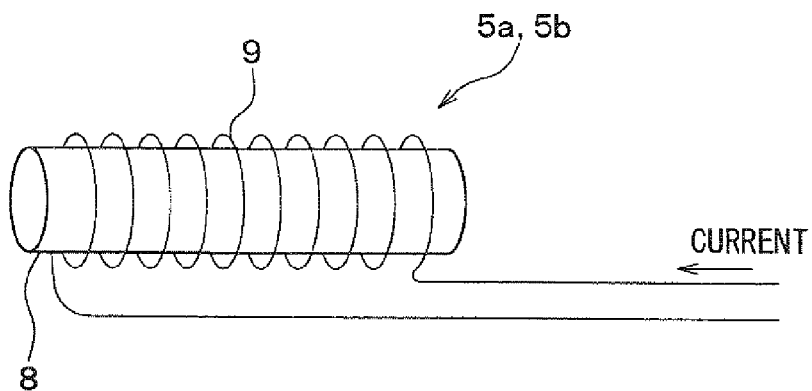
FIG. 2 is a view of a schematic configuration of a trigger unit.

When receiving an instruction signal from the control section of the receiver 3, the trigger arrangement 5 outputs a trigger signal having a predetermined signal strength of 125 to 135 kHz LF band, for example. FIG. 2 is a view of a schematic configuration of each trigger unit 5a, 5b. The trigger unit 5a, 5b is constructed of an antenna for an LF band communicator including a magnetic field type antenna, in which a core 8 is wound by a coil 9. An electric current is caused to flow through the coil 9; thereby, a magnetic field is generated to produce a trigger signal. The trigger signal is transmitted to the receiver 3 by spreading or propagating the magnetic field. Such a magnetic field type antenna is manufactured, for instance, by TOKO, INC. in a core size of 10 mm×10 mm×50 mm, core material of ML24D, and coil turns of 18. Each trigger unit 5a, 5b is attached to the body 7 such that the central axis of the core 8 and the coil 9 is parallel with or along the vehicle-length direction.

As explained above, the trigger arrangement 5 includes a first trigger unit 5a arranged in the front wheel side, and a second trigger unit 5b arranged in the rear wheel side. Each trigger unit 5a, 5b needs to be disposed to have mutually different distances from transceivers 2a to 2d attached to the wheels which are required to receive the trigger signal as reception targets. The trigger unit 5a, 5b is thus disposed to be biased against the center longitudinal line, which divides the vehicle 1 into right and left side portions of the vehicle 1 symmetrically. In the present embodiment, the first trigger unit 5a is provided for transmitting a trigger signal to the transceiver 2a, 2b attached to the right and left front wheels 6a, 6b; the second trigger unit 5b is provided for transmitting a trigger signal to the transceiver 2c, 2d attached to the right and left rear wheels 6c, 6d.

For instance, in the present embodiment, the first trigger unit 5a is arranged near the front left wheel 6b, and the second trigger unit 5b is arranged near the left rear wheel 6d. Both are disposed on the left side portion against the center longitudinal line. The distance from the first trigger unit 5a to the right front wheel 6a is longer than the distance from the first trigger unit 5a to the left front wheel 6b. The distance from the second trigger unit 5b to the right rear wheel 6c is longer than the distance from the second trigger unit 5b to the left rear wheel 6d.

These first and second trigger units 5a and 5b may be arranged anywhere in the body 7 of the vehicle 1. In the present embodiment, each trigger unit 5a, 5b is disposed in a tire housing (inside of a liner). Each trigger unit 5a, 5b can be fixed to the corresponding tire housing by a variety of methods, for instance, using a stay.

Figure 3A:
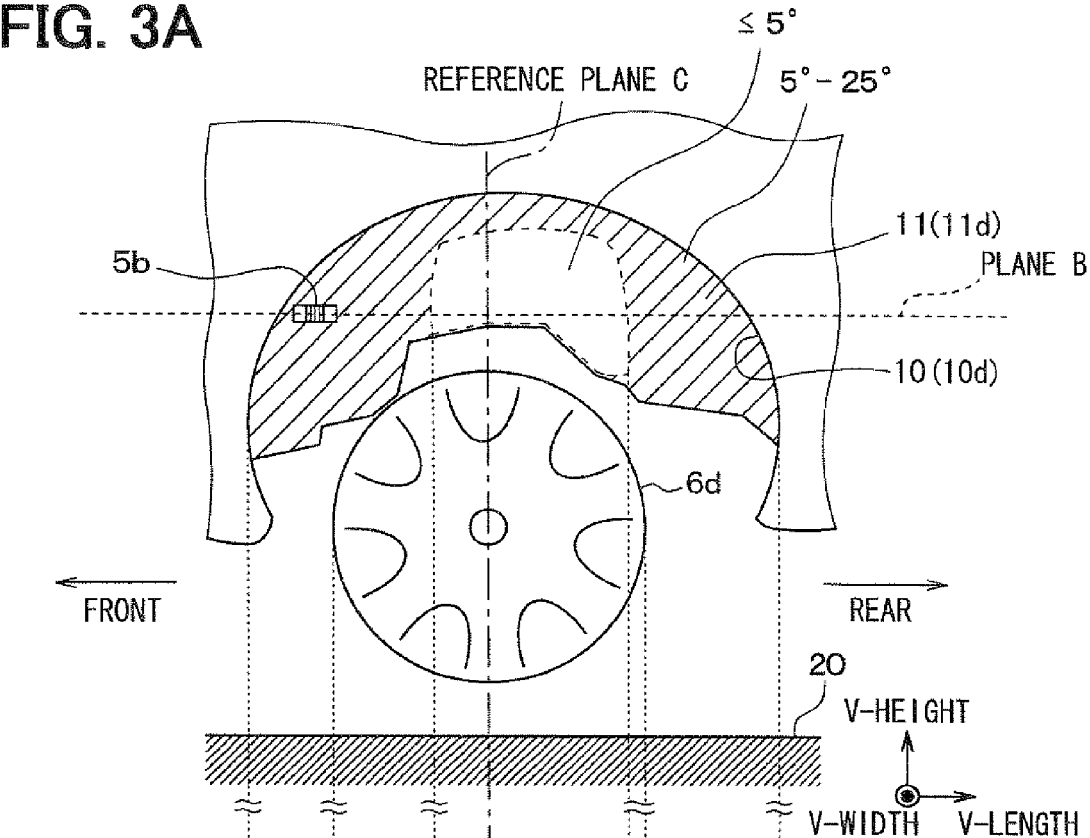
FIG. 3A is a side view for illustrating an arrangement of a trigger unit in a tire housing.
Figure 3B:
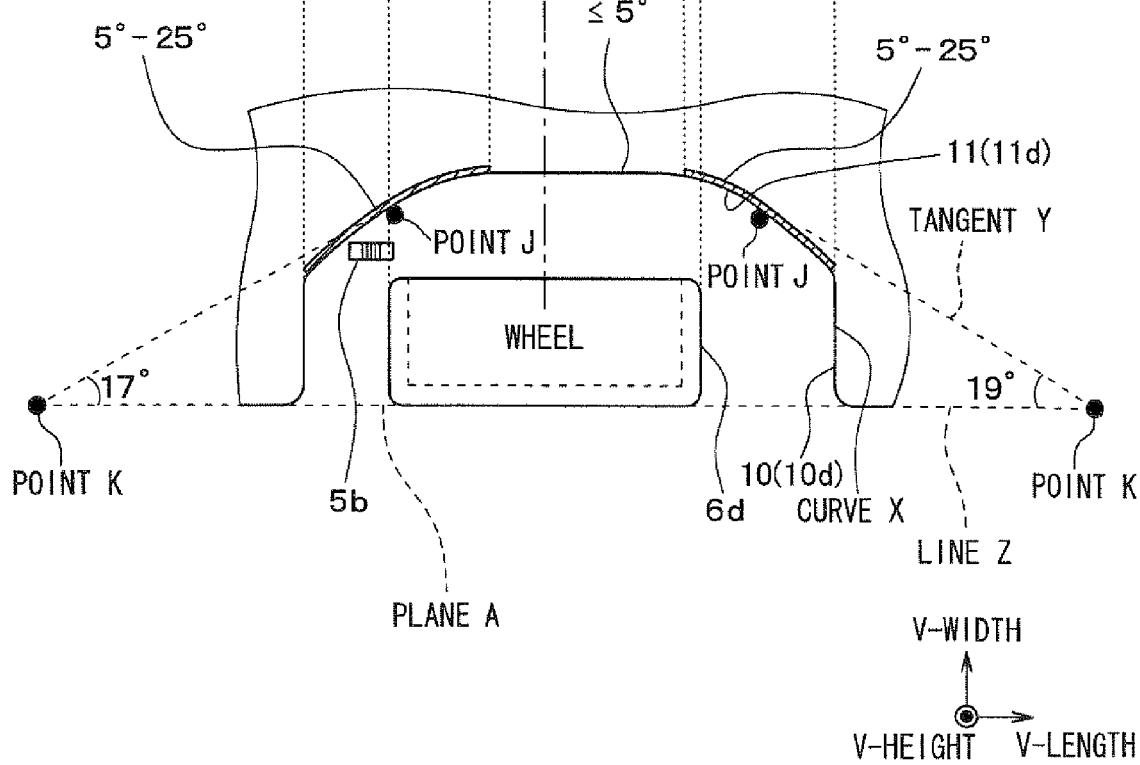
FIG. 3B is a top view for illustrating the arrangement of FIG. 3A.

Hereafter, the details of the fixing position or arrangement of each trigger unit 5a, 5b are explained with reference to FIGS. 3A, 3B and FIG. 4. FIG. 3A is a side view for illustrating an arrangement of the trigger unit 5b in the tire housing 10d, and FIG. 3B is a top view for illustrating the arrangement of FIG. 3A. Although FIGS. 3A, 3B are not sectional views, hatching is applied partially for easy understanding.

As shown as hatching parts in FIG. 3B, an internal wall surface 11d of the tire housing 10d facing the left rear wheel 6d has a surface portion inclined against the side plane A including an external side of the left rear wheel 6d. The side plane A (also referred to as a vertical plane A) is vertical (or perpendicular) to the ground surface and parallel with the vehicle-length direction. An angle W of the wall surface 11d is defined as follows. As explained above, the vertical plane A is defined as a plane including the external side of the wheel 6d facing an outside of the vehicle 1. A mount point J is defined as a point on the wall surface 11d of the tire housing 10d. A horizontal plane B is defined as a plane including the point J and parallel with the ground surface. A curve X is defined as a curve formed by intersecting the horizontal plane B and the wall surface 11d with each other. A tangent Y is defined as a tangent at the point J on the curve X. An intersecting point K is defined as a point formed by intersecting the tangent Y and the vertical plane A. A projection line Z is defined as a line formed by projecting the tangent Y to the vertical plane A on the horizontal plane B. The angle W as an angle of the wall surface 11d is eventually defined as an angle at the intersecting point K formed by intersecting the tangent Y and the projection line Z.

Further, a reference vertical plane C is defined as a plane including a rotation axis of the corresponding wheel 6a to 6d (i.e., the wheel 6d in FIG. 3A, 3B), the plane C being further parallel with the vehicle-width direction and orthogonal to the vehicle-length direction. Yet further, a distance R is defined as a length orthogonal to the reference vertical plane C and towards the front of the vehicle; namely, a positive value is used for the front side while a negative value is used for the rear side of the vehicle with respect to the reference vertical plane C. On the reference plane C, the distance R is thereby zero. For instance, as shown in FIG. 3B, a range of the distance R between −10 cm to +3 cm corresponds to a portion of the wall surface 11d having an angle W equal to or less than 5 degrees. A range of the distance R equal to or less than −10 cm, and another range of the distance R equal to or greater than +3 cm both correspond to a portion of the wall surface 11d having an angle W between 5 and 25 degrees. These are illustrated as hatching portions in FIG. 3B.

Figure 4:
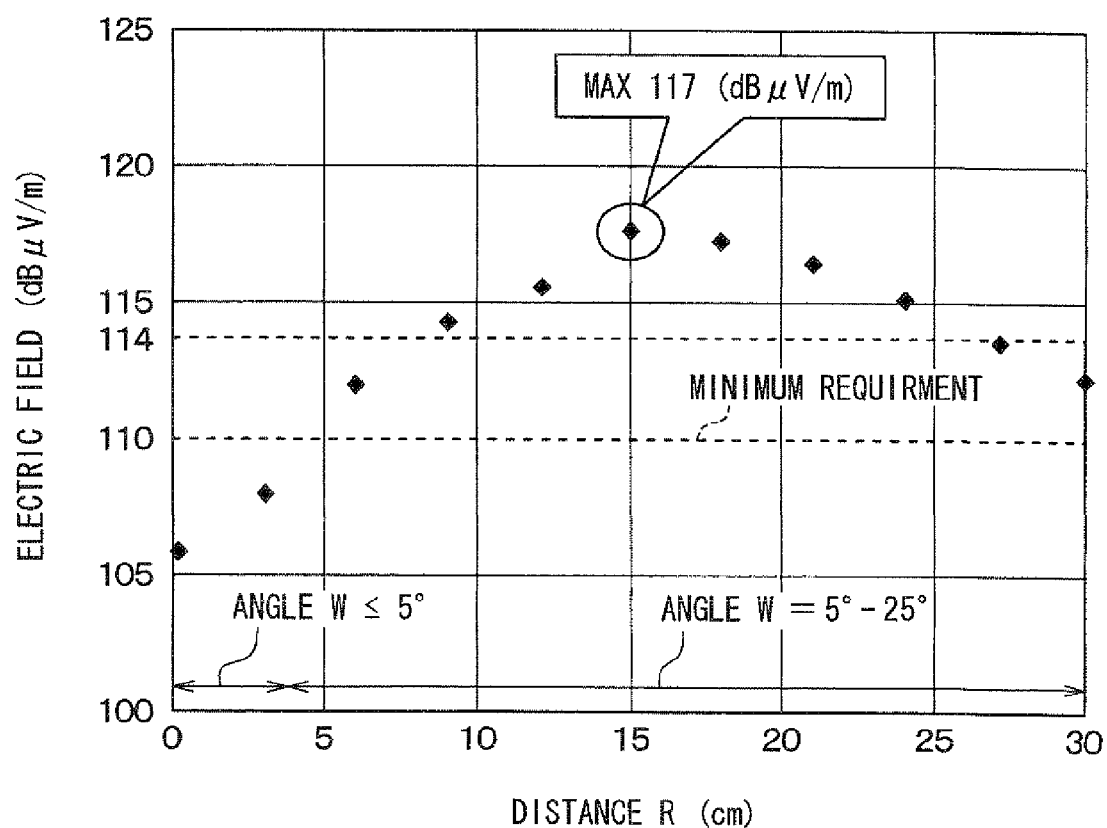
FIG. 4 is a diagram for illustrating an electric field strength at a transceiver in the right rear wheel depending on an arrangement of a second trigger unit adjacent to the left rear wheel in a tire housing.
Figure 5A:
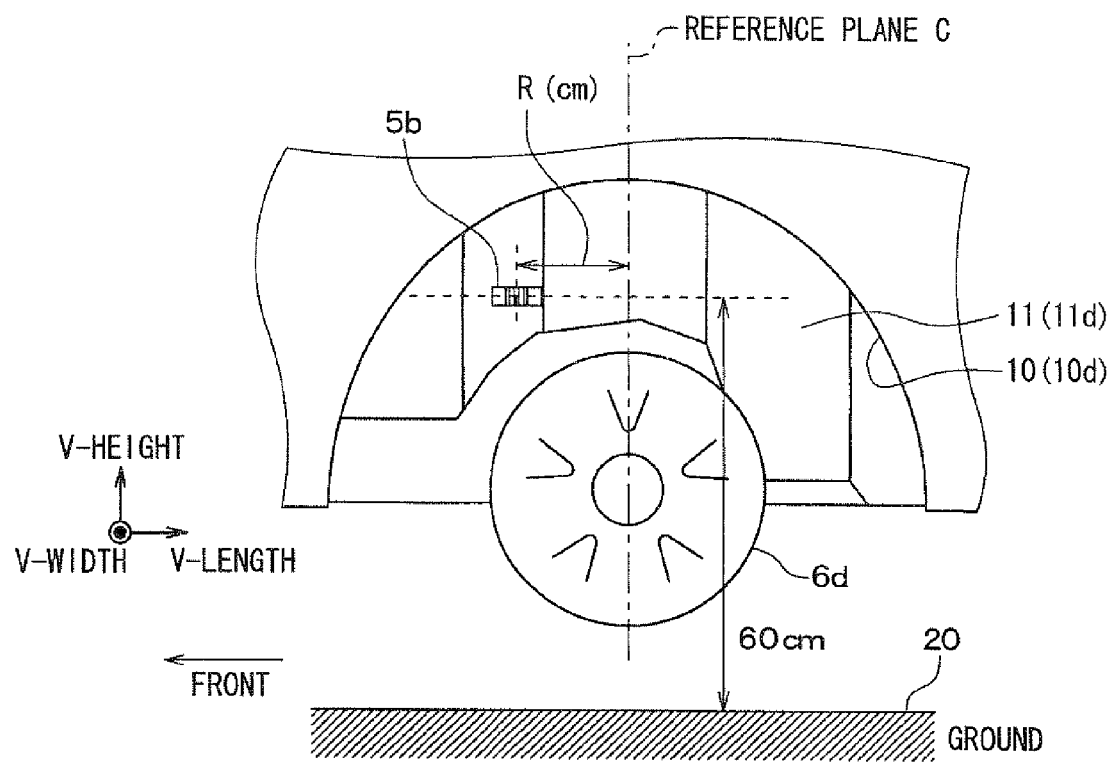
FIG. 5A is an external side view for illustrating a tire housing corresponding to the left rear wheel.
Figure 5B:
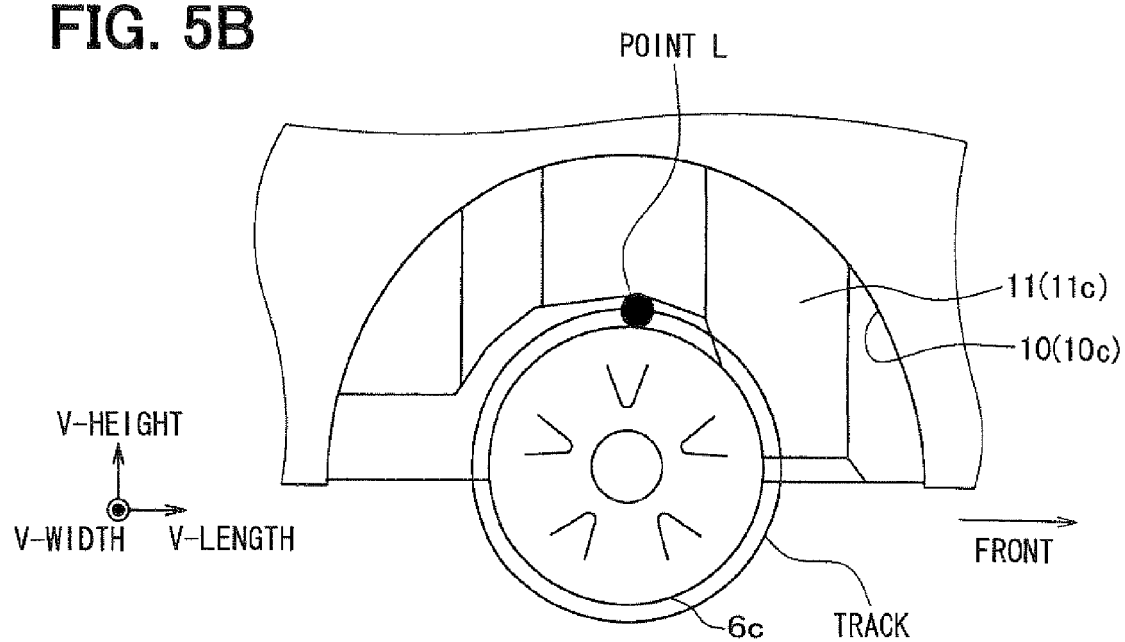
FIG. 5B is an external side view for illustrating a tire housing corresponding to the right rear wheel.

FIG. 4 is a diagram for illustrating an electric field strength [dBμV/m] at the transceiver 2c in the right rear wheel 6c depending on an arrangement of the second trigger unit 5b adjacent to the left rear wheel 6d in the tire housing 10d. FIGS. 5A, 5B are prepared for explaining the measurement conditions of FIG. 4. FIG. 5A is an external side view, which is seen from an outside of the vehicle 1, for illustrating a tire housing 10d corresponding to the left rear wheel 6d, and FIG. 5B is an external side view for illustrating a tire housing 10c corresponding to the right rear wheel 6c.

In FIG. 4, an axis of abscissas illustrates the distance R [cm] of the second trigger unit 5b to the reference vertical plane C including the rotation axis of the corresponding wheel 6d. The front side is positive (+), as explained above. The axis of ordinates illustrates the field strength spread to the transceiver 2c attached to the right rear wheel 6c. FIG. 5B assumes that the second trigger unit 5b is arranged such that the central axis of the core 8 and the coil 9 is disposed parallel with the vehicle-length direction at a height of 60 cm from the ground surface 20. The field strength spread to the transceiver 2c attached to the right rear wheel 6c is measured by varying the distance R at intervals of 3 cm between 0 to 30 cm. Further, it is assumed that the gap of 2 cm is provided between the second trigger unit 5b and the wall surface 11d of the tire housing 10d. In addition, it is assumed that the transceiver 2c is arranged close to the tire tube valve of the right rear wheel 6c, and the valve is disposed with a predetermined distance in a radial direction from an outer circumference of the wheel 6c. Further, as shown in FIG. 5B, it is assumed that the transceiver 2c is presently disposed at the highest point L in the track of the valve. Herein, the highest point L is assigned to as an evaluation point for measuring the electric field strength.

As shown in FIG. 4, when the distance R is +3 cm or less, the field strength spread to the transceiver 2c is equal to or less than 110 [dBμV/m]. The field strength 110 [dBμV/m] is equivalent to the minimum reception sensitivity level or minimum requirement for the transceiver 2 (2c) and, thus, needs to be exceeded. When the distance R is equal to or greater than +3 cm, the field strength is greater than 110 [dBμV/m]. When the distance R is equal to or greater than +9 cm, the field strength is greater than 114 [dBμV/m]. When the distance R is equal to +15 cm, the field strength is the maximum value of 117 [dBμV/m]. Then, the field strength decreases gradually with the increase in the distance R. When the distance R is equal to or less than +27 cm, the field strength is greater than 114 [dBµV/m]. When the distance R reaches +30 cm, the field strength is still equal to or greater than 110 [dBµV/m].

As explained above, the minimum requirement level of the reception field strength for the transceiver 2a to 2d is 110 [dBµV/m]. Setting the distance R to a distance range between +3 cm to +30 cm enables the transceiver 2c attached to the right rear wheel 6c to receive the trigger signal. Further, the real traveling condition and the road surface state may be taken into consideration. It is desirable that the field strength should have a margin to exceed the minimum requirement level of 110 [dBµV/m]. For instance, such a margin may be 4 [dBµV/m]; thus, to achieve the field strength equal to or greater than 114 [dBµV/m], the distance R is desirably set to +9 cm to +27 cm. Furthermore, a greater margin may be taken into consideration. For instance, another margin may be about 3 [dBµV/m]; thus, to achieve the field strength equal to or greater than 117 [dBµV/m], the distance R is most desirably set to +15 cm to +20 cm.

The details of the mechanism generating such a difference in the electric field strength are unknown. It is presumed that the change in the distance R affect the angle of the wall surface 11 with respect to the side of the corresponding wheel. This is explained with reference to FIGS. 6A, 6B.

Figure 6A:
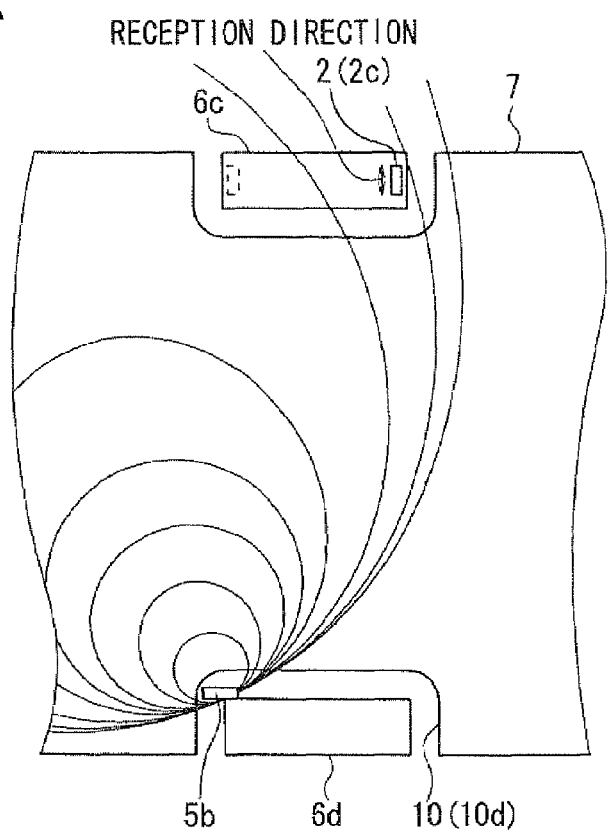
FIGS. 6A, 6B are diagrams for schematically illustrating magnetic fields depending on arrangements of the second trigger unit.
Figure 6B:
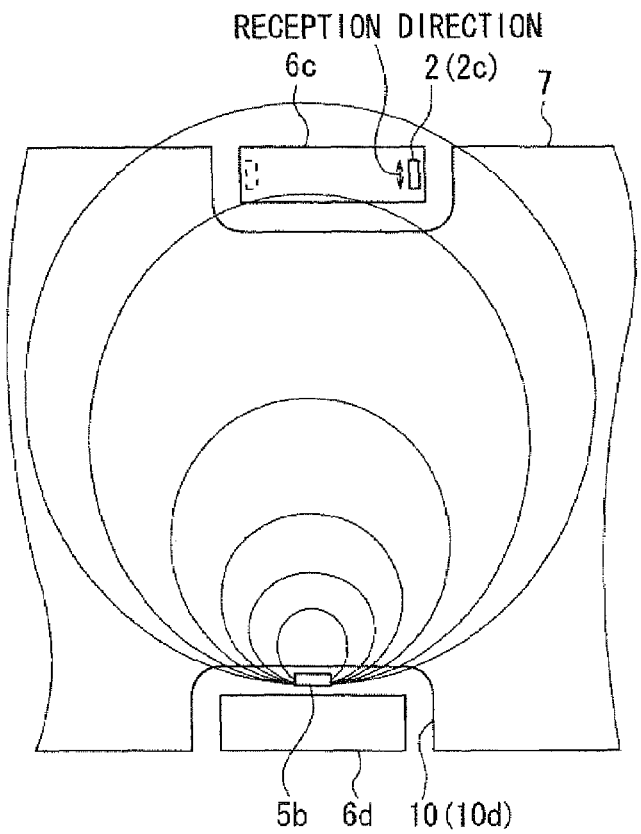

FIGS. 6A, 6B schematically illustrate magnetic fields propagating with respect to an arranged position of the second trigger unit 5b. The second trigger unit 5b includes an antenna for LF band communicator of the magnetic field type. The magnetic field spreads to thereby transmit a trigger signal to the transceiver 2c.

In FIG. 6A, an angle W of the wall surface 11d with respect to the side of the wheel 6d is set to a range between 5 degrees to 25 degrees. Herein, the magnetic field propagates on the surface of the metal constituting the wall surface 11d to thereby incline the propagating direction. Thus, when the magnetic field spreads to an arranged position of the transceiver 2c, the direction of the magnetic field is directed in the direction approximately parallel with the vehicle-width direction equivalent to the reception direction of the transceiver 2c. The field strength in the transceiver 2c seems to be strong or high.

In contrast, with reference to FIG. 6B, an angle W of the wall surface 11d with respect to the side of the wheel 6d is set to equal to or less than 5 degrees. The change in the propagating direction of the magnetic field due to the wall surface 11d is little or nothing. Thus, when the magnetic field spreads to the arranged position of the transceiver 2c, the direction of the magnetic field is directed in the direction approximately orthogonal to the vehicle-width direction equivalent to the reception direction of the transceiver 2c. The field strength in the transceiver 2c seems to be weak or low.

As explained above with reference to FIG. 3A, 3B, 4, the distance R is set to 3 cm to 30 cm towards the front and equal to or greater than 10 cm towards the rear; in other words, an angle W of the wall surface 11 with respect to the side of the wheel 10 is set to a range between 5 degrees to 25 degrees. As a result, it becomes possible to enable the transceiver 2c attached to the right rear wheel 6c to receive the trigger signal. Further, when the distance R towards the front is in a range between 9 cm to 30 cm, the angle W of the wall surface 11d with respect to the side of the wheel 6d is 25 degrees. Even under the same angle W, the field strength is weaker as the distance R increases (approaches the front or departs from the central axis of the wheel. It is desirable that the trigger unit 5b is disposed closer to the central axis of the wheel within the above range.

Explanation is made with respect to the second trigger unit 5b in the above. Similar explanation can be made also with respect to the first trigger unit 5a. However, the configurations of the tire housings 10a to 10d are different between the front side and the rear side of the vehicle 1; thus the arranged position of the first trigger unit 5a is slightly different from that of the second trigger unit 5b. For example, investigation was made with respect to vehicles of which each tire housing of the front wheel has a wall surface 11 only rearward of the central axis of the wheel. As a result, an appropriate arranged position of the first trigger unit 2a is as follows. The distance R is set to equal to or greater than 3 cm in the rear side of the central axis of the wheel, (specifically in a range between 3 to 30 cm, desirably in a range between 9 to 27 cm); in other words, an angle W of the wall surface 11 with respect to the side of the wheel is set to a range between 5 degrees to 25 degrees. Under the above arranged position, the transceiver 2a attached to the right front wheel 6a can receive the trigger signal. Further, the arranged position is desirably designed closer to the central axis of the wheel within the range.

Furthermore, in the present embodiment, the first and the second trigger units 5a, 5b are arranged such that the central axis of the core 8 and the coil 9 is directed parallel to the vehicle-length direction. Such an arrangement is explained with reference to FIGS. 7A, 7B.

Figure 7A:
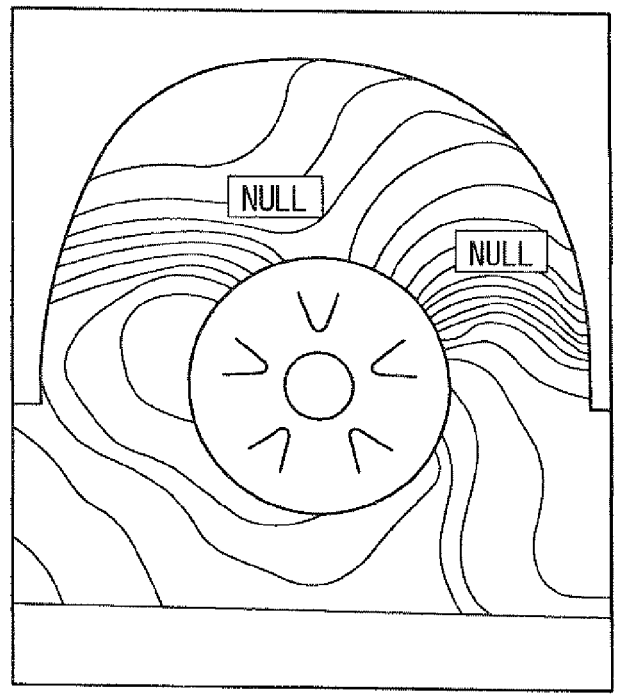
FIG. 7A is a diagram for illustrating an electric field distribution when a trigger unit is arranged parallel with the vehicle-height direction.
Figure 7B:
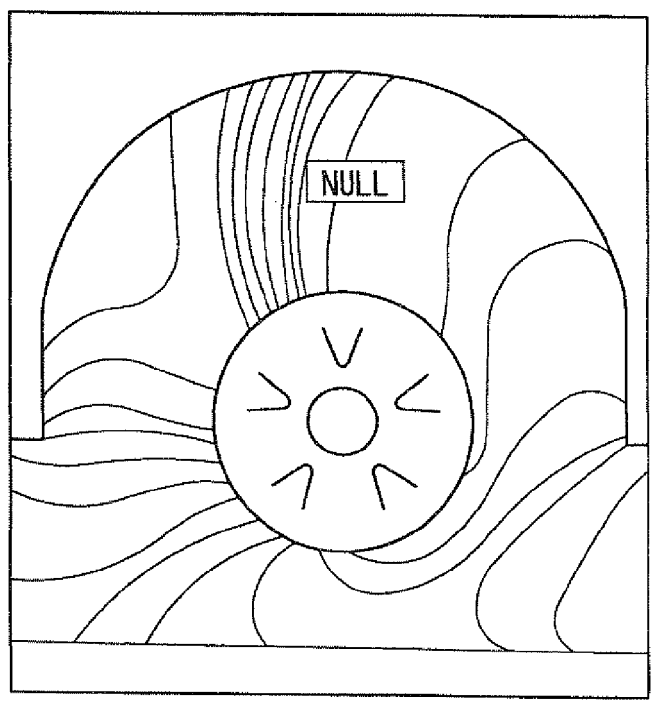
FIG. 7B is a diagram for illustrating an electric field distribution when the trigger unit is arranged parallel with the vehicle-length direction.

FIGS. 7A, 7B illustrate an electric field distribution in a vertical plane including the transceiver 2 around the tire housing 10d of the left rear wheel 6d when the second trigger unit 5b is arranged parallel with the vehicle-height direction and the vehicle-length direction, respectively. Herein, the mount height of the second trigger unit 5b is set to e 60 cm from the ground surface 20, and the distance R is set to 15 cm in the front side.

As illustrated in FIGS. 7A, 7B, the magnetic field is propagated differently depending on the arrangement direction of the second trigger unit 5b. The position (i.e., the null point) where the field strength decreases remarkably varies in the circumference of the wheel. As shown in FIG. 7A, when the arrangement direction of the trigger unit 5b is parallel with the vehicle-height direction, two null points appear. In contrast, as shown in FIG. 7B, when the arrangement direction is parallel with the vehicle-length direction, only one null point appears. In consideration of the above results, it is desirable to arrange each of the first and second trigger units 5a, 5b such that the central axis is at an angle of greater than zero degree and less than 90 degrees with respect to the vehicle-length direction. It is suitable to arrange the trigger unit 5a, 5b parallel with the vehicle-length direction.

In the present embodiment, based on the above investigation results, within an angle range between 5 to 25 degrees of the wall surface 11 with respect to the side of the wheel, the central axis of the core 8 and the coil 9 of the trigger unit 5a, 5b is directed parallel with the vehicle-length direction.

As explained above, according to the present embodiment, the trigger unit 5a, 5b is arranged close to each left wheel of the front and rear side of the vehicle 1 at an angle W of the wall surface 11 with respect to the side of the wheel 6 having a range between 5 degrees to 25 degrees. When the trigger signal outputted from the trigger unit 5a, 5b spreads to the farther-side transceiver 2 in each right wheel 6a, 6c of the front side and rear side of the vehicle 1, the electric field strength can be high. Accordingly, even if the transceiver 2a, 2c attached to each right wheel 6a, 6c of the front side and the rear side is disposed in the farther side with respect to the trigger unit 5a, 5b, the transceiver 2a, 2c can receive the trigger signal with sufficient accuracy.

In addition, the trigger unit 5a, 5b is arranged such that the central axis of the core 8 and coil 9 is parallel with the vehicle-length direction. Such an arrangement can decrease the number of nulls where the trigger signal outputted from the trigger unit 5a, 5b is not received by the closer-side transceiver 2b, 2d in each left wheel 6b, 6d of the front side and rear side of the vehicle 1. This can also enables the left-side transceivers 6b, 6d, which are closer to the trigger units 5a, 5b than the right-side transceivers 2a, 2c, to receive the trigger signal with sufficient accuracy.

Other Embodiments

In the above embodiment, within an angle range between 5 to 25 degrees of the wall surface 11 with respect to the side of the wheel 6, the central axis of the core 8 and the coil 9 of the trigger unit 5a, 5b is directed parallel with the vehicle-length direction. Herein, if the trigger unit 5a, 5b is arranged within an angle range between 5 to 25 degrees of the wall surface 11 with respect to the side of the wheel 6, even the transceivers 2a, 2c, which are disposed farther from the corresponding trigger units 5a, 5b than the transceivers 2b, 2d, can receive the trigger signal with sufficient accuracy. In addition, the angle W of the wall surface 11 with respect to the side of the wheel 6 is not restricted by the height from the ground surface 20. As long as the arranged position is within the tire housing 10, it can be disposed at any height from the ground surface 20.

The above embodiment explains the tire housing 10 corresponding to the front wheel having the wall surface 10a only in the rear side of the central axis of the wheel. If the tire housing 10 corresponding to the front wheel also has the wall surface also in the front side of the central axis of the wheel, the first trigger unit 5a can be disposed not only in the rearward of the central axis of the wheel but also in the frontward of the central axis of the wheel, at an angle W of the wall surface 11 in a range between 5 to 25 degrees, thereby obtaining the effect above.

In addition, the above embodiment explains the first and the second trigger units 5a, 5b arranged near the left front and left rear wheels 6b, 6d, respectively. Herein, the first and the second trigger units 5a, 5b may be arranged near the right front and right rear wheels 6a, 6c, respectively. Further, another trigger arrangement can be adopted. For instance, the front-side trigger unit 5 may be arranged near the right front wheel, while the rear-side trigger unit 5 may be arranged near the left rear wheel. Yet further, naturally, the front-side trigger unit 5 may be arranged near the left front wheel, while the rear-side trigger unit 5 may be arranged near the left rear wheel.

It will be obvious to those skilled in the art that various changes may be made in the above-described embodiments of the present invention. However, the scope of the present invention should be determined by the following claims.

What is claimed is:

1. A trigger unit mounting structure in a wheel position detection system for a vehicle,
    the system including a trigger arrangement for outputting a trigger signal over a magnetic field towards a transceiver attached to each of wheels of the vehicle by comprising a magnetic field type antenna being configured by a core wounded by a coil through which an electric current flows to generate the magnetic field,
    the transceiver receiving the trigger signal, measuring a reception strength of the received trigger signal, and transmitting data of the measured reception strength to a receiver in a body of the vehicle,
    the wheel position detection system thus detecting a wheel position of the each of the wheels based on the data transmitted from the transceiver,
    the trigger arrangement comprising,
        a first trigger unit configured to output a trigger signal to first transceivers individually attached to a right front wheel and a left front wheel; and
        a second trigger unit configured to output a trigger signal to second transceivers individually attached to a right rear wheel and a left rear wheel,
    each trigger unit of (i) the first trigger unit and (ii) the second trigger unit being arranged such that a closer-side wheel of each of (i) front wheels and (ii) rear wheels is closer to the each trigger unit than a farther-side wheel of the each of (i) front wheels and (ii) rear wheels,
    the closer-side wheel being accommodated in a tire housing having an internal wall surface facing the closer-side wheel,
    the each trigger unit being arranged at a point J on the internal wall surface, wherein
        a vertical plane A is defined as a side plane of the closer-side wheel directed in a vehicle-length direction and orthogonal to a ground surface being horizontal,
        a horizontal plane B is defined as a plane including the point J and parallel with the ground surface,
        a curve X is defined by intersecting with each other (i) the horizontal plane B and (ii) the internal wall surface,
        a tangent Y is defined at the point J on the curve X,
        an intersecting point K is defined by intersecting with each other the vertical plane A and the tangent Y,
        a line Z is defined by projecting the tangent Y on an intersecting line formed by (i) the vertical plane A and (ii) the horizontal plane B, and
        an angle W as an angle of the internal wall against the side plane of the closer-side wheel is defined at the intersecting point K by (ii) the tangent Y and (ii) the line Z; and
    wherein each of the first trigger unit and the second trigger unit is arranged at the point J such that the angle W is within a range between 5 degrees to 25 degrees.

2. The trigger unit mounting structure according to claim 1, wherein
    the each trigger unit is arranged such that a central axis of the core and the coil has an angle in a range equal to or greater than zero degree and less than 90 degrees with respect to the vehicle-length direction.

3. The trigger unit mounting structure according to claim 1, wherein
    the each trigger unit is arranged such that a central axis of the core and the coil is parallel with the vehicle-length direction.

4. The trigger unit mounting structure according to claim 1, wherein
    a distance R of the mount point J is defined as a length parallel with the vehicle-length direction and orthogonal to a vertical plane including a rotation axis of the closer-side wheel, and
    the distance R of the second trigger unit is either (i) equal to or greater than 3 cm frontward of the vehicle or (ii) equal to or greater than 10 cm rearward of the vehicle.

5. The trigger unit mounting structure according to claim 4, wherein
    the distance R of the second trigger unit is in a range from 3 cm to 30 cm frontward of the vehicle.

6. The trigger unit mounting structure according to claim 4, the distance R of the second trigger unit is in a range from 9 cm to 27 cm frontward of the vehicle.

7. The trigger unit mounting structure according to claim 1, wherein a distance R of the mount point J is defined as a length parallel with the vehicle-length direction and orthogonal to a vertical plane including a rotation axis of the closer-side wheel, and the distance R of the first trigger unit is equal to or greater than 3 cm either frontward or rearward of the vehicle.

8. The trigger unit mounting structure according to claim 7, the distance R of the second trigger unit is in a range from 3 cm to 30 cm rearward of the vehicle.

9. The trigger unit mounting structure according to claim 7, the distance R of the second trigger unit is in a range from 9 cm to 27 cm rearward of the vehicle.

* * * * *